3,050,396
METHOD OF PRESERVING HAY
Jesse A. Haase, R.R. 5, Martinsville, Ind.
No Drawing. Filed Aug. 19, 1960, Ser. No. 50,578
9 Claims. (Cl. 99—8)

The present invention relates to a method of preserving hay, and is primarily concerned with the problem of preparing fresh-cut hay for storage to be used later as fodder.

It has long been recognized that the conventional procedure of baling fresh-cut hay, either before or after a drying period in the field, is far from satisfactory for the reason that, uncontrollably, hay so baled will sometimes spoil either after very short periods of storage or after the lapse of a substantial period of time. The reasons for these results have not been understood, except in the broadest possible sense, but the undependability of baled hay to be used at a subsequent time for fodder has been a recognized hazard in the field of animal husbandry from time immemorial.

I have discovered that spoilage of baled hay is due primarily to the activity of bacteria, spores and molds, some of which are present in the hay at the time of baling and some of which gather in the baled hay during storage; and that, if the hay is compressed and encased in substantially air-tight containers and is effectively treated to inhibit the growth and reproduction of such bacteria, spores and molds, it will keep indefinitely and with dependable uniformity without spoilage and without substantial loss of attractive appearance, palatability and nutritional value.

It is a primary object of the present invention, therefore, to provide a method of preserving hay against spoilage and against deterioration in appearance, palatability and nutritional value.

I presently consider an optimum container for use in my process to be a bag of flexible, tough synthetic sheet material which is substantially fluid-impermeable and which may be sealed at its ends against substantial ingress or egress of fluid. Preferably, such material is readily permeable by the infra-red spectra of the sun's rays, for a reason which will become apparent. The bags may be cylindrical or polygonal in cross section; and the material should be resistant to tearing, capable of some stretching without rupture and preferably somewhat resilient. I presently believe that clear polyethylene sheet material in gauges within the range between 0.050" and 0.100" is optimum for use in my process, though other sheet materials having similar characteristics can be used with varying degrees of efficiency and, under some circumstances, it may be desirable to use a black pigmented sheet.

It is desirable, but not essential, to reduce the moisture content of the hay before encasing it in containers. Fresh-cut hay normally has a moisture content in the neighborhood of 80%; and I have found that, if hay of that moisture content is compressed and encased in air-tight bags, free moisture tends to collect at low points inside the bags. When such bags are stored in the open or in a barn through winters during which they are subjected to temperatures which frequently sink below and rise above 32° F., the alternate freezing and melting of such collected moisture physically damages those portions of the hay which are immersed therein, thus rendering such hay portions unattractive in appearance. So far as I have been able to determine, the nutritional value of the physically damaged hay is not deleteriously affected; but it is desirable to avoid such damage.

Additionally, a reduction of the moisture content correspondingly reduces the weight of a quantity of hay which can be encased in a container of given dimensions, and thereby facilitates the handling of the finished packages. Additionally, such moisture reduction increases the quantity of actual food which can be packed into a container of given dimensions.

For these reasons, I prefer to treat the hay in such a fashion as to reduce its moisture content to a value within the range between 20% and 50% before packing it into the containers. Such moisture reduction can be accomplished by physical squeezing or by heating or by a combination of those two actions. Any suitable means may be utilized to accomplish the moisture reduction; but I presently prefer to use a combination of compression and heating to that end, for reasons which will appear.

It is desirable to compress the hay to a very substantial extent before packing it into the containers, primarily for the purpose of minimizing the quantity of air which will be enclosed with the hay when the container is sealed. Inevitably, some air will remain in the interstices of even a compressed hay mass; but minimization of the amount of oxygen remaining in the closed container presently appears to me to be quite desirable.

For optimum results, it is essential that the hay shall be heated to a degree, and for a time, sufficient to kill or to render inactive substantially all of the bacteria, spores and molds which are inevitably present in fresh-cut hay. I have found that, if the hay is brought to a temperature in the neighborhood of 180° F. for a period of at least ten seconds, and if the hay is promptly thereafter compressed and enclosed in a substantially air-tight container, satisfactory results are thereby achieved and the hay will keep indefinitely in satisfactory condition for use as fodder, in such air-tight containers. I have also found that, if the temperature of the hay is brought to a value of at least 140° F. for periods of several hours on each of two or more substantially successive days, while the hay is protected against accumulation of further bacteria, spores and molds from the circumambient atmosphere, satisfactory results are achieved. Subjection of the hay to intermediate temperature values for periods of time inversely variable between the above mentioned extremes will, it is believed, sufficiently inhibit the activity of foreign organisms to achieve satisfactory results.

Upon the theory that deterioration of hay in air-tight containers will progress only in the presence of oxygen, I have made some experiments in which I have omitted the step of heating for sterilization and have packaged within each container a quantity of solid carbon dioxide of a mass at least equal to the mass of oxygen in the air present in the interstices of the compressed hay but insufficient to rupture the container upon evaporation; and I have been able to store hay under such conditions with reasonably satisfactory results. However, I presently believe that optimum results can be achieved only when the hay is subjected to sterilizing heat either before or after packaging.

Such sterilization can be achieved, before compression and packaging, by flash-heating hay by passing it, in a relatively thin layer, over a highly heated drum, holding the hay in contact with the drum long enough so that every particle of the hay will attain a temperature of approximately 180° F. for at least ten seconds. Alternatively, I have found that, if the hay is compressed and packaged in air-tight containers, of the character above described, without preliminary heating, and then is allowed to lie in the field, under a summer sun, for a period of at least two bright days, temperatures in the range between 120 and 150° F. will be attained within the package and the hay will keep satisfactorily for indefinite periods, presumably because activity of the detrimental organisms has been inhibited by such long exposure to such temperatures.

Except where the packaged hay is subjected to the high concentration of carbon dioxide resulting from the use of solid carbon dioxide as described above, hay which is packaged in air-tight bags without heat treatment either before or after packaging, becomes silage. Apparently, the bacteria present when the hay is packaged without such heat treatment remain active until they exhaust the oxygen which was present in the air at the time of packaging and during such activity they produce an acid which inhibits their further activity but which changes the character of the hay.

In some instances in which the hay has been packaged without preliminary heating and has thereafter been exposed to the action of the summer sun, it has been found that, after many months of storage, while most of the hay is still in good condition, some mold has formed near the center of the package.

In one instance, exhaustive tests were run upon hay which had been flash heated to 180° F., treated for reduction of moisture content and then compressed and bagged and stored for a period of approximately six months, with the following results:

Moisture: 53%.
pH (acidity as hydrogen ion concentration) 5.0. This is believed to indicate the formation of some lactic acid.
Molds: Very few.
Bacteria: Gram positive types present, some in fair numbers. No gram negative found. The gram positives included:
    (a) Some spores of spore forming bacteria. Of course, these are not killed in any pasteurizing treatment.
    (b) Some inert cocci. These are rather heat resistant and akin to those causing high counts in some pasteurized milk.
    (c) Cocci and a few rods which had reproduced slightly (as in silage, only not as much) giving rise to the lactic acid found.
    (d) Some actinomycetes. Probably "streptomyces." These are undesirable—if they were to reproduce much they would give an earthy odor as in freshly spaded garden soil. Slight reproduction would not be noticed by man or (presumably) cow.

I claim as my invention:

1. The method of preserving hay which comprises the steps, in any sequence, of encasing a compressed mass of hay in a substantially air-tight container, and treating the hay to inhibit the growth and reproduction of bacteria, spores and mold.

2. The method of preserving hay which comprises the steps, in any sequence, of encasing a compressed mass of hay in a substantially air-tight container, and subjecting the hay to heat at a temperature and for a time sufficient to inhibit the growth and reproduction of bacteria, spores and mold.

3. The method of preserving hay which comprises the steps, in any sequence, of reducing the moisture content of the hay to a value in the range between 20% and 50%, compressing the hay and encasing the hay in a substantially air-tight container, and subjecting the hay to heat at a temperature and for a time sufficient to inhibit the growth and reproduction of bacteria, spores and mold.

4. The method of preserving hay which comprises the steps of flash-heating the hay to a temperature of approximately 180° F. to reduce the moisture content of the hay to a value not substantially exceeding 50% and to kill living organisms in the hay, and then promptly compressing the hay and encasing it in a substantially air-tight container.

5. The method of preserving hay which comprises the steps of compressing the hay and encasing it in a substantially air-tight bag of sheet material permeable to the sun's rays, and subjecting the bagged hay to direct sunlight for a period of at least two days.

6. The method of preserving hay which comprises the steps, in any sequence, of encasing a compressed mass of hay in a substantially air-tight container, and subjecting the hay to heat in the range between at least 180° F. and 140° F. for a period of time within the range between 10 seconds for the maximum temperature and at least two days for the minimum temperature.

7. The method of preserving hay which comprises the steps of reducing the moisture content of the hay to a value within the range between 20% and 50%, compressing the dried hay, and encasing the dried, compressed hay in a substantially air-tight container with a minimum inclusion of oxygen.

8. The method of preserving hay which comprises the steps of reducing the moisture content of the hay to a value within the range between 20% and 50%, compressing the dried hay, packing the dried, compressed hay tightly into a flexible container of substantially air-impermeable material, inserting into the container a charge of solid carbon dioxide of a mass at least equal to the mass of oxygen in the air unavoidably present in the interstices of the compressed hay but insufficient to rupture the container upon evaporation, and then promptly closing the container to render the same substantially fluid-tight.

9. The method of preserving hay which comprises the steps of reducing the moisture content of the hay to a value not exceeding 50%, encasing it in a polyethylene bag, closing the bag against the ingress or egress of fluid, and subjecting the bagged hay to direct sunlight for a period of at least two days.

References Cited in the file of this patent

UNITED STATES PATENTS

| | | |
|---|---|---|
| Re. 5,981 | Page | July 21, 1874 |
| 1,186,391 | Gary | June 6, 1916 |
| 2,054,094 | Murch | Sept. 15, 1936 |
| 2,318,576 | Arnold | May 11, 1943 |
| 2,491,495 | Hart et al. | Dec. 20, 1949 |

OTHER REFERENCES

"The Handbook of Feedstuffs," by Seiden et al., Springer Publishing Co., Inc., New York, 1957, p. 229.